United States Patent
Wu et al.

(10) Patent No.: US 11,152,171 B2
(45) Date of Patent: Oct. 19, 2021

(54) DIRECT CURRENT BREAKER BASED ON VACUUM MAGNETIC BLOWOUT TRANSFER AND BREAKING METHOD THEREOF

(71) Applicant: XI'AN JIAOTONG UNIVERSITY, Xi'an (CN)

(72) Inventors: Yi Wu, Xi'an (CN); Yifei Wu, Xi'an (CN); Fei Yang, Xi'an (CN); Mingzhe Rong, Xi'an (CN); Chunping Niu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 16/712,720

(22) Filed: Dec. 12, 2019

(65) Prior Publication Data

US 2020/0343062 A1 Oct. 29, 2020

(30) Foreign Application Priority Data

Apr. 23, 2019 (CN) .......................... 201910322257.1

(51) Int. Cl.
*H01H 33/18* (2006.01)
*H02H 9/02* (2006.01)

(52) U.S. Cl.
CPC .............. *H01H 33/18* (2013.01); *H02H 9/02* (2013.01)

(58) Field of Classification Search
CPC .. H01H 9/541; H01H 9/542; H01H 2009/543; H01H 33/596; H01H 9/446; H01H 33/6641; H01H 2085/386; H02H 9/02; H02H 9/042; H02H 3/087; H02H 3/20

USPC ...... 218/22, 28, 43, 141; 361/2, 4, 8, 13, 14
See application file for complete search history.

(56) References Cited

U.S. PATENT DOCUMENTS

| | | | | |
|---|---|---|---|---|
| 4,250,364 A | * | 2/1981 | Kimblin | H01H 33/6641 218/141 |
| 5,452,170 A | * | 9/1995 | Ohde | H01H 33/596 174/DIG. 17 |
| 5,517,378 A | * | 5/1996 | Asplund | H01H 33/596 361/3 |
| 2012/0032762 A1 | * | 2/2012 | Lescale | H01H 33/02 335/11 |

(Continued)

*Primary Examiner* — William A Bolton
(74) *Attorney, Agent, or Firm* — Dragon Sun Law Firm, PC; Jinggao Li, Esq.

(57) ABSTRACT

There is provided a direct current breaker based on vacuum magnetic blowout transfer and a breaking method thereof. The direct current breaker includes a first connection terminal, a second connection terminal, a main current branch, a transfer branch, an energy dissipation branch and a blowout unit. The main current branch is connected between the first connection terminal and the second connection terminal. During current conduction of the direct current breaker, current flows through the main current branch. The transfer branch is connected between the first connection terminal and the second connection terminal and connected in parallel with the main current branch. The energy dissipation branch is connected between the first connection terminal and the second connection terminal and connected in parallel with the main current branch and the transfer branch. The blowout unit is arranged between the main current branch and the transfer branch.

8 Claims, 10 Drawing Sheets

(56) References Cited

U.S. PATENT DOCUMENTS

| | | | | |
|---|---|---|---|---|
| 2014/0218832 A1* | 8/2014 | Yang | ............ | H02H 7/222 |
| | | | | 361/87 |
| 2015/0222111 A1* | 8/2015 | Magnusson | ........ | H01H 33/006 |
| | | | | 361/91.5 |
| 2016/0322179 A1* | 11/2016 | Hwang | ............ | H01H 33/596 |
| 2016/0329179 A1* | 11/2016 | Kim | ............ | H01H 9/542 |
| 2018/0138687 A1* | 5/2018 | Yang | ............ | H01H 33/596 |
| 2018/0138689 A1* | 5/2018 | Wu | ............ | H02H 3/087 |

\* cited by examiner

DIRECT CURRENT BREAKER BASED ON VACUUM MAGNETIC BLOWOUT TRANSFER AND BREAKING METHOD THEREOF

CROSS-REFERENCE TO RELATED APPLICATIONS

This application claims priority to and the benefit of CN 2019103222571, filed Apr. 23, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure relates to the technical field of direct current breakers, and more particularly relates to a direct current breaker which regulates and controls an arc by using a magnetic blowout circuit to realize or assist in current transfer, and a breaking method thereof.

BACKGROUND

Due to the unique superiority of direct current power supply systems, a direct current power grid technology has a broad application prospect in the field of power transmission and distribution, and is an important direction for the development of power technologies in China in the future. At present, the direct current power supply systems are used in many important industries such as urban trolleybus, subway, smelting, chemical engineering, solar power generation, rolling, marine electric & electronic engineering and mining. As a key component of the direct current power grid technology, a direct current breaking technology is a guarantee for the safe operation of power systems. A direct current breaker has a protection function of cutting off fault current of a loop and is the most important protection element in the direct current system.

Because the direct current system lacks a natural zero crossing point, it is impossible to achieve the current breaking with the traditional communication idea in high-voltage and high-capacity breaking. An effective way to solve this problem is based on a novel breaking method based on current transfer. In the breaking process of this type of breaker, a mechanical switch is firstly opened, current is transferred among a plurality of branches, so that the break current crosses zero, and a breaking voltage is finally established to achieve the system current breaking. There are many ways to realize the current transfer. The most effective one is to use an arc voltage of an existing break to force the current to flow from one branch to the other. However, the arc voltage of a vacuum break commonly used in the direct current circuit breaker is relatively low, usually not exceeding 50 V, and has the problems of low transfer speed and low transfer reliability, so that it is difficult to meet engineering application requirements of direct current system short-circuit breaking.

The above information is merely used to enhance the understanding to the background of the present disclosure, so that the information may possibly contain information that does not constitute the prior art known to those of ordinary skill in the art in China.

Therefore, a heretofore unaddressed need exists in the art to address the aforementioned deficiencies and inadequacies.

SUMMARY

In view of the shortcomings or deficiencies of the prior art described above, the present disclosure aims to provide a direct current breaker based on vacuum magnetic blowout transfer and a breaking method thereof. An applied magnetic field is generated by a magnetic blowout circuit to substantially raise a vacuum arc voltage. The current transfer effect is enhanced under the condition that the arc extinguish performance of an insulating medium is constant.

Specifically, the present disclosure adopts the following technical solution:

a direct current breaker based on vacuum magnetic blowout transfer, including:

a first connection terminal, configured as an inlet wire of the direct current breaker;

a second connection terminal, configured as an outlet wire of the direct current breaker;

a main current branch, connected between the first connection terminal and the second connection terminal, wherein during current conduction of the direct current breaker, the current flows through the main current branch;

a transfer branch, connected between the first connection terminal and the second connection terminal and connected in parallel with the main current branch;

an energy dissipation branch, connected between the first connection terminal and the second connection terminal and connected in parallel with the main current branch and the transfer branch; and a blowout unit, arranged between the main current branch and the transfer branch, wherein the blowout unit includes a blowout circuit and a blowout coil; during current breaking of the direct current breaker, the blowout circuit excites the blowout coil to generate magnetic blowout so as to raise an arc voltage; and the current is transferred from the main current branch to the transfer branch based on the arc voltage.

In the direct current breaker, the blowout coil includes a transverse-magnetic blowout coil and/or a longitudinal-magnetic blowout coil. The blowout circuit is an independent external circuit.

In the direct current breaker, after the current is completely transferred from the main current branch to the transfer branch, the transfer branch is turned off, and the current is transferred into the energy dissipation branch to achieve direct current breaking.

In the direct current breaker, the main current branch includes a vacuum break, an air insulation break, a high-voltage gas insulation break, a power electronic element and a combination thereof. The transfer branch includes a power electronic element, a capacitor, a reactor and a series-connected and parallel-connected combination thereof. The power electronic element includes a thyristor, a diode, an IGBT (Insulated Gate Bipolar Translator), an IGCT (Integrated Gate Commutated Thyristor) and a combination thereof.

In the direct current breaker, the transfer branch includes a capacitor and a magnetic coupling current transfer module which are connected in series, and the magnetic coupling current transfer module includes a plurality of magnetic induction units connected in parallel.

In the direct current breaker, the blowout unit includes a blowout circuit, a capacitor and a thyristor which are connected in series.

In the direct current breaker, the direct current breaker is a one-way direct current breaker or a two-way direct current breaker.

In the direct current breaker, the transfer branch includes a first branch, a second branch connected in parallel with the first branch, and a third branch connected with the first branch and the second branch. The first branch includes a first diode and a second diode. The second branch includes a third diode and a fourth diode. The third branch includes a capacitor and an inductor. The positive pole of the first diode is connected in series with the positive pole of the second diode. The negative pole of the third diode is connected in series with the negative pole of the fourth diode. The positive pole of the third diode is connected with the negative pole of the first diode. The positive pole of the fourth diode is connected with the negative pole of the second diode. One end of the capacitor is connected between the positive pole of the first diode and the positive pole of the second diode, and the other end of the capacitor is connected in series with the inductor. The other end of the inductor is connected between the negative pole of the third diode and the negative pole of the fourth diode.

In the direct current breaker, the third branch is replaced by a plurality of IGBTs and/or IGCTs connected in series.

According to another aspect of the present disclosure, a breaking method of the direct current breaker includes the following steps:

Step I, during current conduction of the direct current breaker, enabling the current to pass through the main current branch;

Step II, during current breaking of the direct current breaker, exciting, by the blowout circuit, the blowout coil to generate magnetic blowout so as to raise an arc voltage, and transferring the current from the main current branch to the transfer branch based on the arc voltage; and Step III, after the current is completely transferred from the main current branch to the transfer branch, turning off the transfer branch, and transferring the current into the energy dissipation branch to achieve direct current breaking.

Beneficial Effects

By the applied blowout magnetic field, the present disclosure greatly raises the arc voltage and changes the current situation that the natural current transfer is hardly realized due to the low vacuum arc voltage. The present disclosure is easy to realize, includes a small number of parts, does not affect the structure of an original vacuum mechanical switch and is high in reliability. The blowout magnetic field may be freely adjusted according to a requirement and is an effective way to realize the current transfer. The present disclosure is high in reliability, has an extremely high engineering application value, greatly raises the arc voltage and accelerates the current transfer process, has application value in all the fields of a rapid alternating current breaker, a current limiter and the like, and even may directly break the current in the low-voltage direct current field.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

The foregoing and other objectives, features and advantages of the present disclosure will be better understood through illustrative and nonrestrictive detailed descriptions below of the embodiments of the present disclosure with reference to the accompanying drawings.

Figure 1:
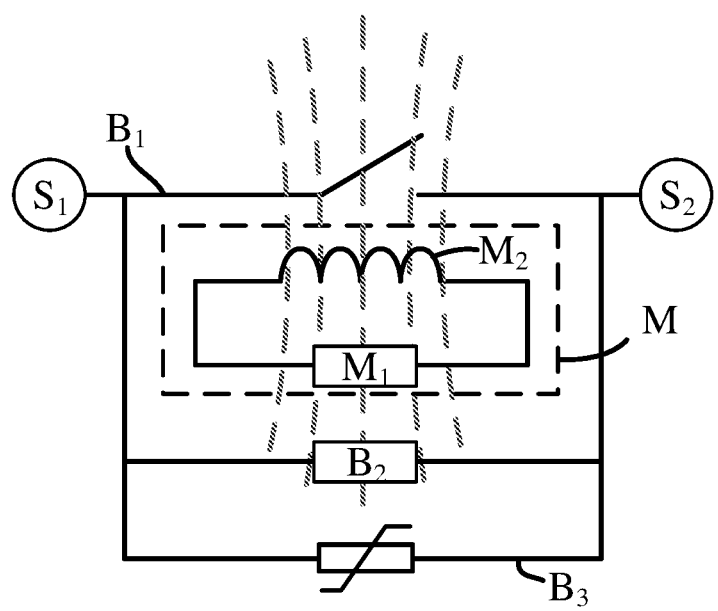
FIG. 1 is a circuit schematic diagram of a topological structure of a direct current breaker according to one embodiment of the present disclosure.

In the drawings, $B_1$: main current branch; $B_2$: transfer branch; $B_3$: energy dissipation branch; M: blowout unit; $M_1$: blowout circuit; $M_2$: blowout coil; $S_1$: first connection terminal; $S_2$: second connection terminal; and MICCM: magnetic coupling current transfer module.

All the drawings are schematic, and do not have to be completely consistent. The present disclosure is further explained below in combination with the drawings and the embodiments.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The detailed descriptions below are actually merely exemplary and are not intended to limit applications and uses. Furthermore, the present disclosure is not restricted by the above technical field, background, summary or any explicit or implied theories shown in the detailed descriptions below. Unless otherwise explicitly stated to the contrary, the word "include" and different variations thereof shall be comprehended as impliedly including the components, but not excluding other components.

The specific implementations of the present disclosure are described below in combination with FIGS. 1 to 10.

FIG. 1 is a structural schematic diagram of a breaker body. A direct current breaker based on vacuum magnetic blowout transfer includes:

a first connection terminal $S_1$, configured as an inlet wire of the direct current breaker;

a second connection terminal $S_2$, configured as an outlet wire of the direct current breaker;

a main current branch $B_1$, connected between the first connection terminal $S_1$ and the second connection terminal $S_2$, wherein during current conduction of the direct current breaker, the current flows through the main current branch $B_1$;

a transfer branch $B_2$, connected between the first connection terminal $S_1$ and the second connection terminal $S_2$ and connected in parallel with the main current branch $B_1$;

an energy dissipation branch $B_3$, connected between the first connection terminal $S_1$ and the second connection terminal $S_2$ and connected in parallel with the main current branch $B_1$ and the transfer branch $B_2$; and a blowout unit M, arranged between the main current branch $B_1$ and the transfer branch $B_2$, wherein the blowout unit M includes a blowout circuit $M_1$ and a blowout coil $M_2$; during current breaking of the direct current breaker, the blowout circuit $M_1$ excites the blowout coil $M_2$ to generate magnetic blowout so as to raise an arc voltage; and the current is transferred from the main current branch $B_1$ to the transfer branch $B_2$ based on the arc voltage.

The main current branch, the transfer branch and the energy dissipation branch of the present disclosure are connected in parallel. When the current breaking is performed, the current transfer may be performed in the three parallel-connected branches. The blowout circuit excites the blowout coil to generate the magnetic blowout, and the current transfer is realized or assisted under the action of the magnetic blowout. The two connection terminals serve as the inlet wire and the outlet wire of the direct current breaker to realize a function of connecting the breaker with an external line. When the current breaking is performed in the present disclosure, the special blowout unit generates the external magnetic blowout to realize or assist in the current transfer process.

In one embodiment of the direct current breaker, the blowout coil $M_2$ includes a transverse-magnetic blowout coil and/or a longitudinal-magnetic blowout coil. The blowout circuit $M_1$ is an independent external circuit.

In another embodiment of the direct current breaker, after the current is completely transferred from the main current branch $B_1$ to the transfer branch $B_2$, the transfer branch $B_2$ is turned off, and the current is transferred into the energy dissipation branch $B_3$ to achieve direct current breaking.

In another embodiment of the direct current breaker, the main current branch $B_1$ includes a vacuum break, an air insulation break, a high-voltage gas insulation break, a power electronic element and a combination thereof. The transfer branch $B_2$ includes a power electronic element, a capacitor, a reactor and a series-connected and parallel-connected combination thereof. The power electronic element includes a thyristor, a diode, an IGBT (Insulated Gate Bipolar Translator), an IGCT (Integrated Gate Commutated Thyristor) and a combination thereof.

In another embodiment of the direct current breaker, the transfer branch $B_2$ includes a capacitor and a magnetic coupling current transfer module which are connected in series, and the magnetic coupling current transfer module includes a plurality of magnetic induction units connected in parallel.

In another embodiment of the direct current breaker, the blowout unit M includes a blowout circuit $M_1$, a capacitor and a thyristor which are connected in series.

In another embodiment of the direct current breaker, the direct current breaker is a one-way direct current breaker or a two-way direct current breaker.

In another embodiment of the direct current breaker, the transfer branch $B_2$ includes a first branch, a second branch connected in parallel with the first branch, and a third branch connected with the first branch and the second branch. The first branch includes a first diode and a second diode. The second branch includes a third diode and a fourth diode. The third branch includes a capacitor and an inductor. The positive pole of the first diode is connected in series with the positive pole of the second diode. The negative pole of the third diode is connected in series with the negative pole of the fourth diode. The positive pole of the third diode is connected with the negative pole of the first diode. The positive pole of the fourth diode is connected with the negative pole of the second diode. One end of the capacitor is connected between the positive pole of the first diode and the positive pole of the second diode, and the other end of the capacitor is connected in series with the inductor. The other end of the inductor is connected between the negative pole of the third diode and the negative pole of the fourth diode.

In another embodiment of the direct current breaker, the third branch is replaced by a plurality of IGBTs and/or IGCTs connected in series.

In order to further understand the present disclosure, the present disclosure is described by a plurality of examples below. FIG. 1 illustrates a circuit schematic diagram of a topological structure of a direct current breaker according to one embodiment of the present disclosure, including a main current branch $B_1$, a transfer branch $B_2$, an energy dissipation branch $B_3$, a blowout unit M, a first connection terminal $S_1$ and a second connection terminal $S_2$. The blowout unit includes a blowout circuit $M_1$ and a blowout coil $M_2$. The two connection terminals $S_1$ and $S_2$ serve as an inlet wire and an outlet wire of the direct current breaker to realize a function of connecting the breaker with an external line. In the present embodiment, the three branches $B_1$, $B_2$ and $B_3$ are connected in parallel. When the breaker is normally conducted, the main current branch $B_1$ bears the whole rated current, and when the breaker performs current breaking, the current is transferred stage by stage and is finally broken. Since the main current branch $B_1$ is composed of a single vacuum mechanical switch, the vacuum arc voltage is often extremely low, and the arc voltage transferring mode is low in speed and low in reliability, so that it is difficult to meet the requirements for timeliness and reliability of the direct current breaking. In the present disclosure, the external blowout unit M is added in the traditional direct current breaker solution, so that during the current breaking, the blowout circuit $M_1$ is used to excite the blowout coil $M_2$ to generate the magnetic blowout, and the arc voltage is raised under the action of the magnetic blowout, which makes it possible to directly transfer the current by the arc voltage, thereby realizing the current transfer from the branch $B_1$ to the branch $B_2$ and greatly improving the speed and reliability of the current transfer.

Figure 2:
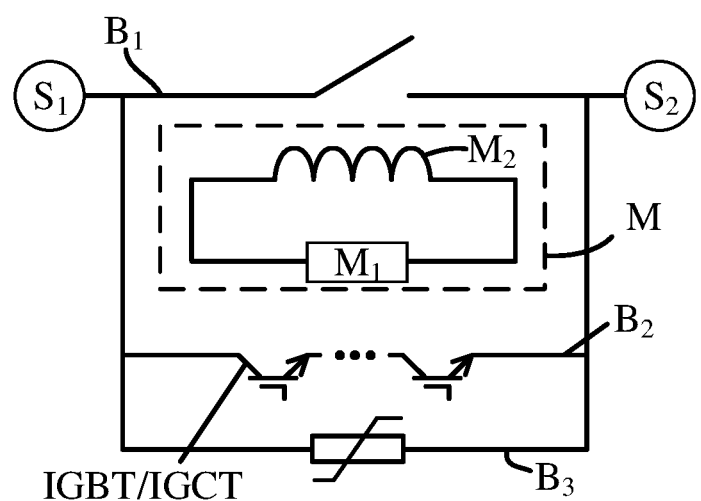
FIG. 2 is a circuit schematic diagram of a topological structure of a direct current breaker according to another embodiment of the present disclosure, wherein in the present embodiment, an IGBT (Insulated Gate Bipolar Translator) series-connected assembly constitutes a transfer branch.

According to the direct current breaker based on vacuum magnetic blowout transfer of the present disclosure, constituting elements of the transfer branch include, but not limited to, a power electronic element thyristor, a diode, an IGBT, an IGCT and a series-connected and parallel-connected combination thereof, a capacitor, a reactor and a series-connected and parallel-connected combination thereof. FIG. 2 illustrates a circuit schematic diagram of a topological structure of a direct current breaker according to another embodiment of the present disclosure. In this embodiment, an IGBT series-connected assembly constitutes a transfer branch. A breaking process is as follows: firstly, a vacuum mechanical switch of a main current branch $B_1$ is turned on and strikes an arc, and also triggers the IGBT assembly of the transfer branch $B_2$ to be conducted; at the moment, a blowout circuit $M_1$ excites a blowout coil $M_2$ to generate an external magnetic blowout; then, current is rapidly transferred from the main current branch to the transfer branch under the action of the magnetic blowout; after the current is completely transferred, the vacuum switch quenches the arc; and finally, the current is transferred into an energy dissipation branch $B_3$ by turning off the IGBT assembly, and an arrester dissipates system energy to finally achieve the direct current breaking. In this embodiment, the IGBT series-connected assembly also may be equivalently replaced by an IGCT series-connected assembly.

Figure 3:
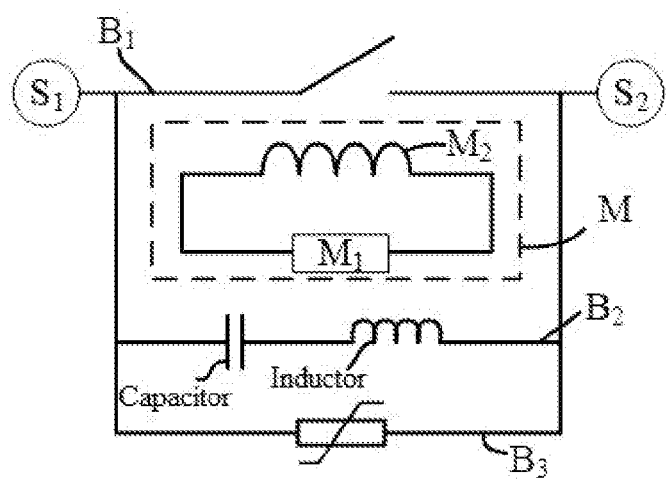
FIG. 3 is a circuit schematic diagram of a topological structure of a direct current breaker according to another embodiment of the present disclosure, wherein in the present embodiment, a capacitor and an inductor constitute a transfer branch.

FIG. 3 illustrates a circuit schematic diagram of a topological structure of a direct current breaker according to another embodiment of the present disclosure. In this embodiment, a capacitor and an inductor constitute a transfer branch.

Figure 4:
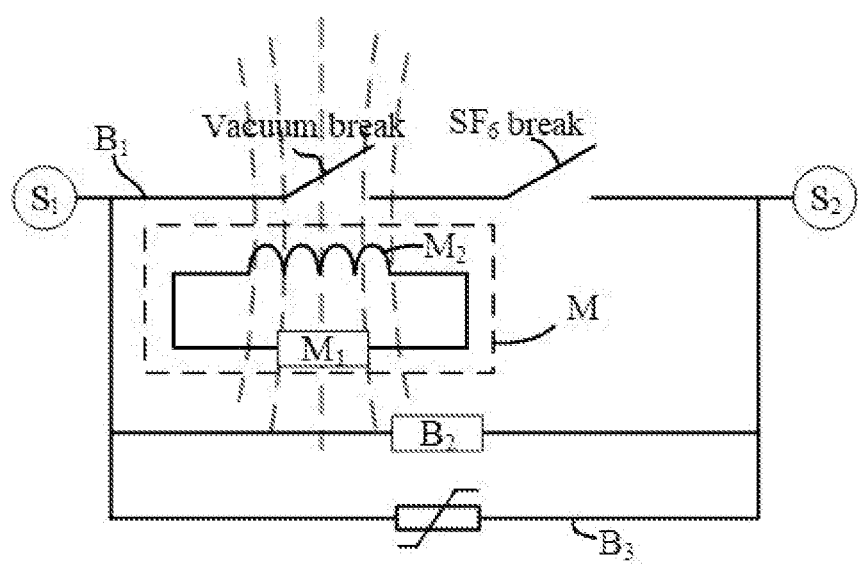
FIG. 4 is a circuit schematic diagram of a topological structure of a direct current breaker according to another embodiment of the present disclosure, wherein in the present embodiment, a vacuum switch and an $SF_6$ switch jointly constitute a main current branch.

Advantageously, the main current branch $B_1$ of the present disclosure may be composed of a single vacuum mechanical switch, and also may be composed of an air insulation switch, a high-voltage gas insulation switch and a power electronic element which are connected in series and in parallel on the basis of the vacuum switch. FIG. 4 illustrates a circuit schematic diagram of a topological structure of a direct current breaker according to another embodiment of the present disclosure. In this topology, the main current branch $B_1$ is jointly composed of a vacuum mechanical switch and an $SF_6$ switch. Functionally, the current is still transferred from the main current branch $B_1$ to the transfer branch $B_2$ by depending on the action of the magnetic blowout of the blowout unit M.

Figure 5:
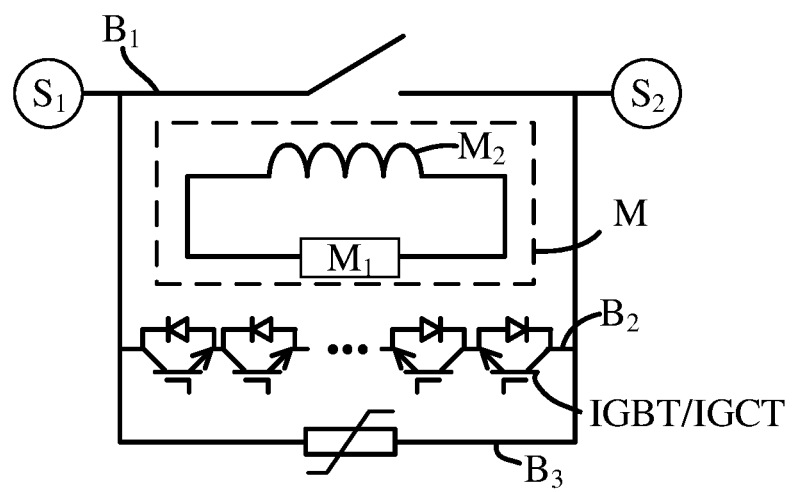
FIG. 5 is a circuit schematic diagram of a topological structure of a two-way direct current breaker according to one embodiment of the present disclosure.
Figure 6:
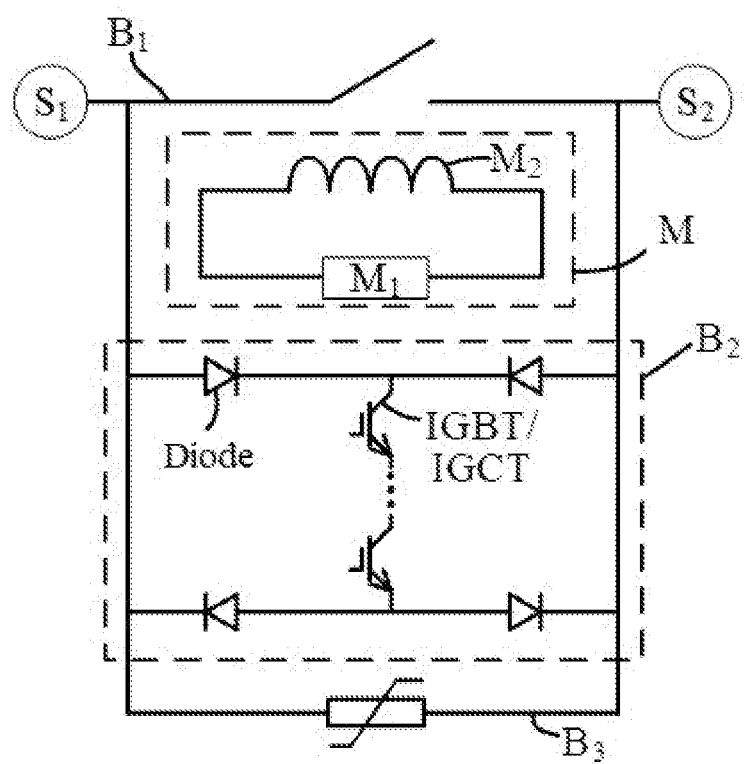
FIG. 6 is a circuit schematic diagram of a topological structure of a two-way direct current breaker according to another embodiment of the present disclosure.
Figure 7:
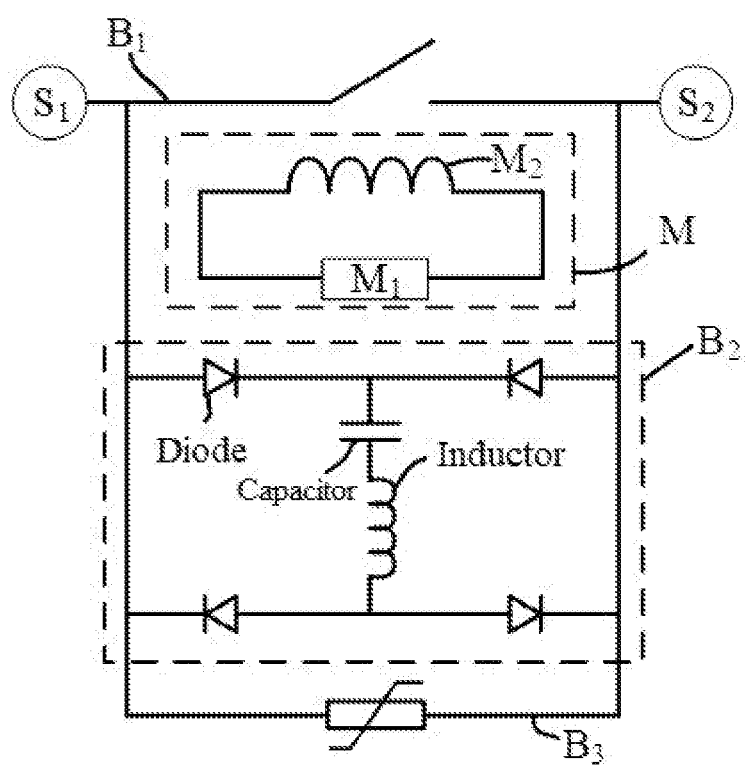
FIG. 7 is a circuit schematic diagram of a topological structure of a two-way direct current breaker according to another embodiment of the present disclosure.

Advantageously, the direct current breaker based on vacuum magnetic blowout transfer according to the present disclosure may not only be applied to the above one-way direct current breaker, but also be applied to a two-way direct current breaker. FIGS. 5, 6 and 7 illustrate three possibly implemented two-way direct current breaker solutions based on the present disclosure.

Figure 8:
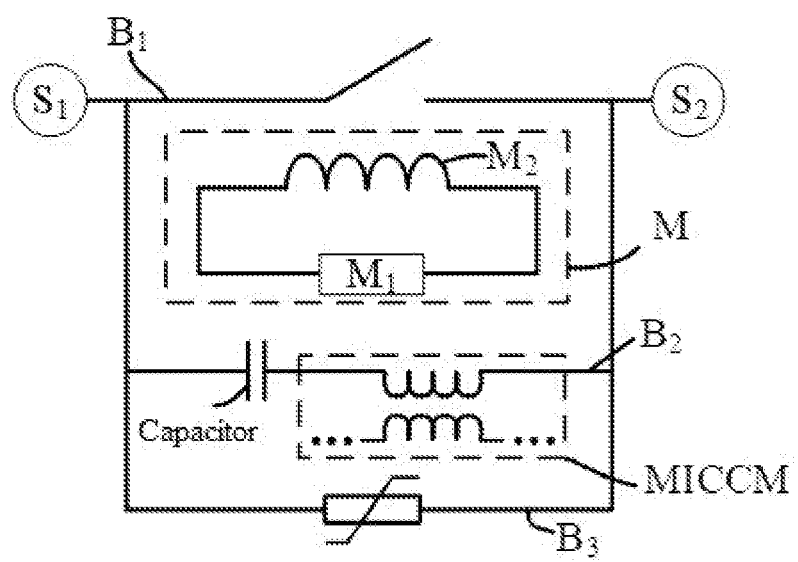
FIG. 8 is a circuit schematic diagram of a topological structure of a direct current breaker which assists in current transfer by using magnetic blowout according to one embodiment of the present disclosure.

According to the direct current breaker based on vacuum magnetic blowout transfer of the present disclosure, the current transfer may be realized by completely depending on the magnetic blowout generated by the blowout unit of the present disclosure, and the magnetic blowout of the present disclosure also may serve as an assisting measure for the current transfer. The current transfer process is accelerated and enhanced through the magnetic blowout generated by the blowout unit. FIG. 8 is a topological structure of a direct current breaker which assists in current transfer by using magnetic blowout according to the present disclosure. According to the embodiment, the present disclosure is implemented on the basis of an original magnetic coupling current transfer module MICCM so as to achieve the aim of enhancing the current transfer effect.

Figure 9:
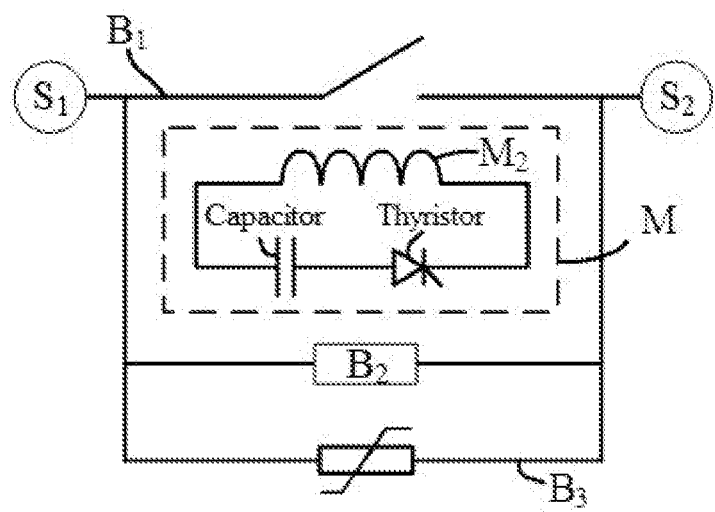
FIG. 9 is a circuit schematic diagram of a topological structure of a direct current breaker according to another embodiment of the present disclosure, wherein a blowout circuit is independent from a main topology.
Figure 10:
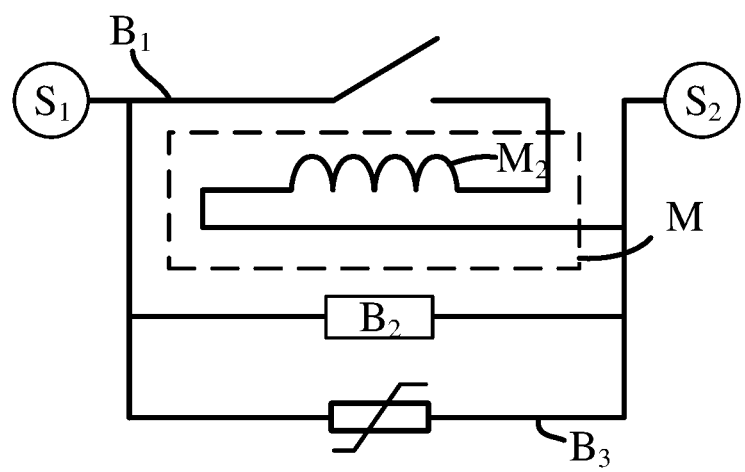
FIG. 10 is a circuit schematic diagram of a topological structure of a direct current breaker according to another embodiment of the present disclosure, wherein a blowout circuit is dependent on a main topology.

According to the direct current breaker based on vacuum magnetic blowout transfer of the present disclosure, the blowout circuit $M_1$ may be an independent external circuit, and also may be a contact-related internal circuit. FIGS. 9 and 10 respectively illustrate embodiments of the present disclosure: an independent capacitance power supply mode and a dependent power supply mode connected in series with a contact.

The present disclosure solves the problems of slow current transfer and non-reliable transfer by raising the arc voltage, has the advantages of simplicity, easy and convenient adjustment and no influence on an original contact structure and the insulation characteristic of the contact, and has extremely high engineering application value.

In one embodiment, the direct current breaker bears system current during normal working, and the main current branch includes a vacuum break.

The main current branch also may include, but not limited to, an air insulation break, a high-voltage gas insulation break, a power electronic element and a combination thereof.

In one embodiment, constituting elements of the transfer branch include, but not limited to, a power electronic element, a capacitor, a reactor and a series-connected and parallel-connected combination thereof.

In one embodiment, the power electronic element includes, but not limited to, a thyristor, a diode, an IGBT, an IGCT and a combination thereof, and also may include a series-connected and parallel-connected combination of a single type or various types of power electronic elements.

In one embodiment, the blowout coil may be a transverse-magnetic blowout coil, and also may be a longitudinal-magnetic blowout coil. Furthermore, a plurality of or various coils may simultaneously perform blowout.

In one embodiment, the blowout circuit may be an independent external circuit, and also may be a contact-related internal circuit.

In one embodiment, the energy dissipation branch includes, but not limited to, an arrester assembly.

In one embodiment, the current transfer may be realized or assisted by the magnetic blowout. Specifically, the current transfer may be realized by completely depending on the magnetic blowout generated by the blowout unit, and the current transfer process also may be accelerated and enhanced through the magnetic blowout generated by the blowout unit. The direct current breaker may be a one-way direct current breaker, and also may be a two-way direct current breaker.

According to another aspect of the present disclosure, a breaking method of the direct current breaker includes the following steps:

Step I, during current conduction of the direct current breaker, the current passes through the main current branch $B_1$;

Step II, during current breaking of the direct current breaker, the blowout circuit M excites the blowout coil $M_2$ to generate magnetic blowout so as to raise an arc voltage, and the current is transferred from the main current branch $B_1$ to the transfer branch $B_2$ based on the arc voltage; and Step III, after the current is completely transferred from the main current branch $B_1$ to the transfer branch $B_2$, the transfer branch $B_2$ is turned off, and the current is transferred into the energy dissipation branch $B_3$ to achieve direct current breaking.

The above content is a further detailed description to the present disclosure in combination with the specific preferred implementations, and it cannot be understood that the specific implementations of the present disclosure are limited thereto. Those of ordinary skill in the art to which the present disclosure belongs also can make a plurality of simple deductions or replacements without departing from the concept of the present disclosure. For example, a one-way direct current breaker based on a one-way solid-state switch branch and a one-way oscillation branch, etc. are deducted. These deductions or replacements shall all be regarded as falling within the protection scope defined by submitted claims of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A direct current breaker based on vacuum magnetic blowout transfer, comprising:
    a first connection terminal, configured as an inlet wire of the direct current breaker;
    a second connection terminal, configured as an outlet wire of the direct current breaker; a main current branch comprising a vacuum mechanical switch, connected between the first connection terminal and the second connection terminal, wherein during current conduction of the direct current breaker, current flows through the main current branch;
    a transfer branch comprising at least two IGBT/IGCT (Insulated Gate Bipolar Transistor)/(Integrated Gate Commutated Thyristor) in series, connected between the first connection terminal and the second connection terminal and connected in parallel with the main current branch;
    an energy dissipation branch, connected between the first connection terminal and the second connection terminal and connected in parallel with the main current branch and the transfer branch; and
    a blowout unit, arranged between the main current branch and the transfer branch, wherein the blowout unit comprises a blowout circuit and a blowout coil in parallel; during current breaking of the direct current breaker, the blowout circuit excites the blowout coil to generate magnetic blowout so as to raise an arc voltage; and the current is transferred from the main current branch to the transfer branch based on the arc voltage.

2. The direct current breaker according to claim 1, wherein the blowout coil comprises a transverse-magnetic blowout coil and/or a longitudinal-magnetic blowout coil, and the blowout circuit is an independent external circuit.

3. The direct current breaker according to claim 1, wherein after the current is completely transferred from the main current branch to the transfer branch, the transfer branch is turned off, and the current is transferred into the energy dissipation branch to achieve direct current breaking.

4. The direct current breaker according to claim 1, wherein the direct current breaker is a one-way direct current breaker or a two-way direct current breaker.

5. A breaking method of the direct current breaker according to claim 1, comprising the following steps:
    Step I, during current conduction of the direct current breaker, enabling the current to pass through the main current branch; Step II, during current breaking of the direct current breaker, exciting, by the blowout circuit, the blowout coil to generate magnetic blowout so as to raise the arc voltage, and transferring the current from the main current branch to the transfer branch based on the arc voltage; and
    Step III, after the current is completely transferred from the main current branch to the transfer branch, turning off the transfer branch, and transferring the current into the energy dissipation branch to achieve direct current breaking.

6. The breaking method of the direct current breaker according to claim 5, wherein the blowout coil comprises a transverse-magnetic blowout coil and/or a longitudinal-magnetic blowout coil, and the blowout circuit is an independent external circuit.

7. The breaking method of the direct current breaker according to claim 5, wherein after the current is completely transferred from the main current branch to the transfer branch, the transfer branch is turned off, and the current is transferred into the energy dissipation branch to achieve direct current breaking.

8. The breaking method of the direct current breaker according to claim 5, wherein the direct current breaker is a one-way direct current breaker or a two-way direct current breaker.

* * * * *